Figures 5, 6:
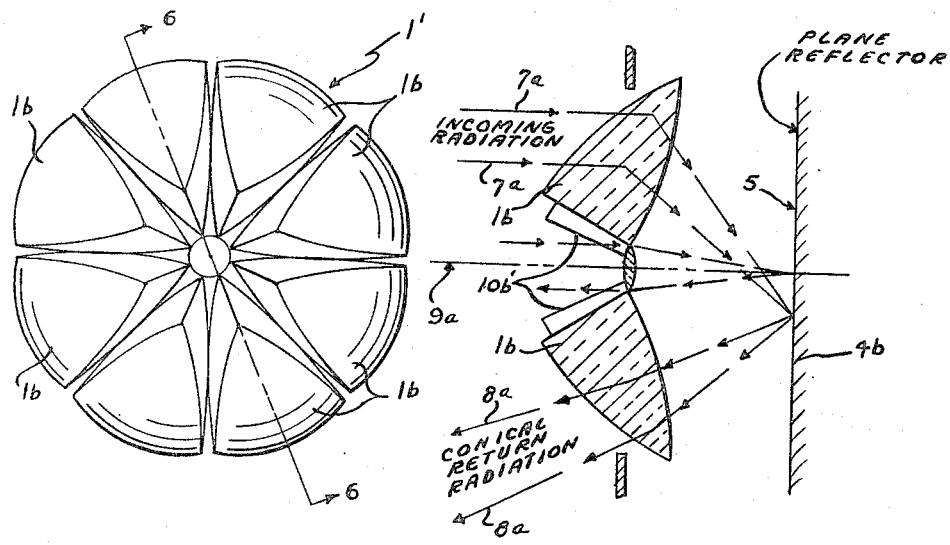

May 2, 1967 Y. E. STAHLER ETAL 3,317,911
ELECTROMAGNETIC LENSES FOR RADIANT ENERGY
COMMUNICATION SYSTEMS
Filed Nov. 7, 1963 3 Sheets-Sheet 1
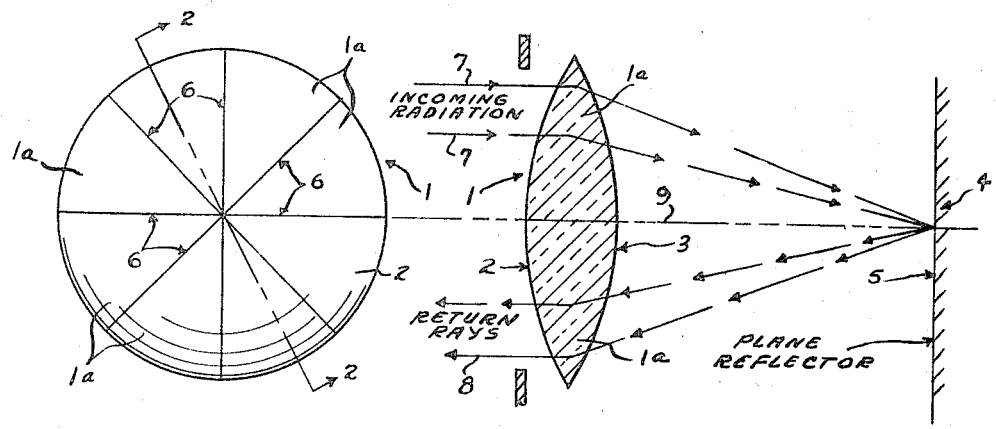
Fig-1  Fig-2
Fig-3  Fig-4
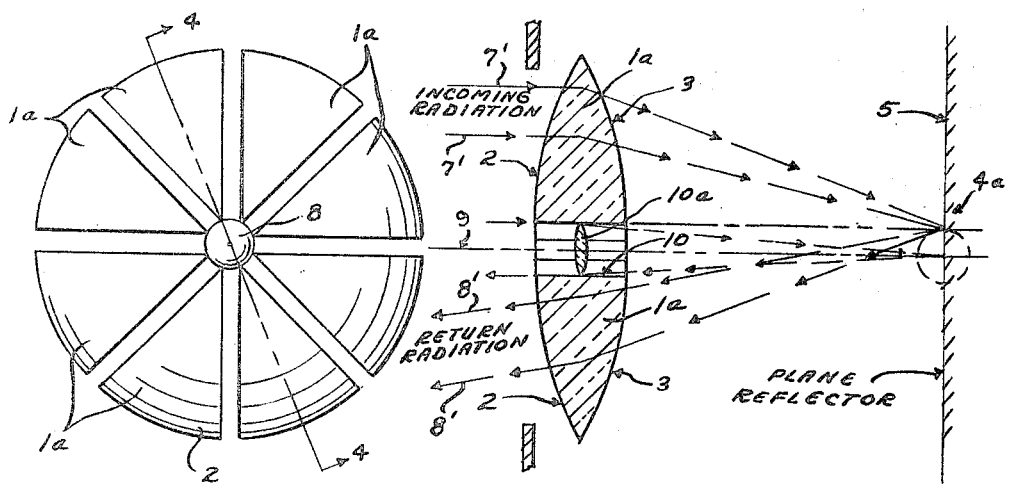
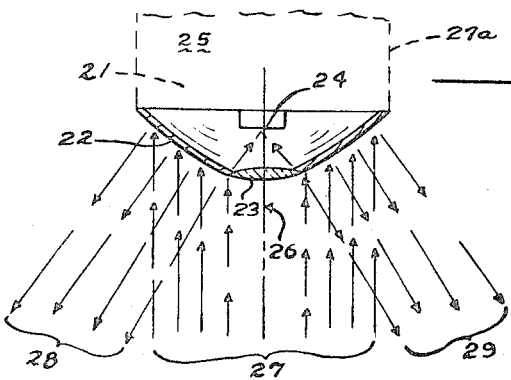
Fig-10
INVENTORS
YLO E. STAHLER
ALLEN L. JOHNSON
BY
ATTORNEYS

INVENTORS
YLO E. STAHLER
ALLEN L. JOHNSON

May 2, 1967 Y. E. STAHLER ETAL 3,317,911
ELECTROMAGNETIC LENSES FOR RADIANT ENERGY
COMMUNICATION SYSTEMS
Filed Nov. 7, 1963 3 Sheets-Sheet 3

INVENTORS
YLO E. STAHLER
ALLEN L. JOHNSON
BY
ATTORNEYS

United States Patent Office 3,317,911
Patented May 2, 1967

3,317,911
ELECTROMAGNETIC LENSES FOR RADIANT ENERGY COMMUNICATION SYSTEMS
Ylo E. Stahler and Allen L. Johnson, Dayton, Ohio, assignors to the United States of America as represented by the Secretary of the Air Force
Filed Nov. 7, 1963, Ser. No. 322,255
7 Claims. (Cl. 343—755)

The invention described herein may be manufactured and used by or for the United States Government for governmental purposes without payment to us of any royalty thereon.

This invention relates to electromagnetic lens constructions and arrangements and, more particularly, to passive electromagnetic lens systems for aerial vehicles and satellites, having for an object, passive electromagnetic lens and reflector constructions and systems whereby incoming radiant energy from a transmitting station is reflected back in the form of a wide conical shell-like area surrounding the transmitter in radially spaced relation thereto with only a small portion of the reflected radiant energy scattered diectly back to the transmitter inside of the wide conical shell-like area for tracking and control purposes of an aerial vehicle or satellite carrying the passive lens and reflector systems.

A further object of the invention is the provision of an annular electromagnetic lens having a reflector behind the lens at the focal point of the lens for reflecting incoming substantially collimated radiant energy from a transmitting station back through the lens in a substantially conical shell-like beam in materially radially spaced surrounding relation to the transmitter, whereby concentrated radiant energy from the transmitter is directed back over a wide circular ring-like area encircling the transmitter.

A further object is the provision of a lens for radiant energy rays from a distant transmitter in which curvature from common lens constuctions is altered in such a way that the focal point of the lens is altered into a focal ring concentric to the lens axis by initiating the lens curvature at a predetermined radial distance from the central axis of the lens.

A further object of the invention is the provision of an annular positive lens element in which the curvature of the lens surfaces starts at a predetermined radial distance from the central axis of the lens to provide an annular concentric ring-like positive lens portion surrounding the central axis to form a focal ring of rays passing through the lens instead of a focal point, lying on a circle in spaced concentric relation to the central axis of the lens, and a flat radiant energy reflector extending in a plane perpendicular to the lens axis in through the focal ring, whereby incoming collimated radiant energy from a transmitting station through said lens ring is reflected back by said reflector through said lens in an annular conical shell-like beam encircling the transmitted energy path from the transmitter.

A further object includes a central conventional positive electromagnetic lens portion concentric to the central axis and located within the center of the annular positive lens ring having a focal point located in the plane of the reflector on said central axis.

A further object is the provision of an annular electromagnetic positive lens element in which the radius of curvature of the lens surfaces gradually changes in successive steps or rings from the outer edge of the lens to the central axis, and a plane reflector disposed perpendicular to said axis in or adjacent the focal point of one of said annular differently curved spherical ring portions of the lens.

Another object of this invention is the provision of a plurality of positive similar biconvex lens segments equally spaced from each other in a ring about a central axis to dispose the focal point of said lens segments in a concentric ring radially spaced from said central axis, and a flat reflector disposed perpendicular to said axis in the plane of said focal points.

A still further object includes a second positive lens means concentrically disposed on said axis within the ring of said segments having a focal point in the plane of the reflecting surface on said central axis.

A still further object is the provision of a plurality of substantially identical positive biconvex electromagnetic lens segments arranged in a ring around a central axis in equally spaced relation to each other, in radially spaced relation to said central axis, in which the mean planes between the curved surfaces are tilted uniformly toward the central axis toward the plane of the reflector.

A further object is the provision of means for receiving beamed radiant energy from a transmitting station and returning the beamed radiant energy back toward the transmitting station in the form of a conical shell-like expanding beam surrounding the transmitting station in materially radially spaced relation thereto, whereby the returned radiant energy covers a large ring-like area surrounding the transmitting station.

Yet another object of this invention includes a means for returning a central portion of the beamed radiant energy directly back to the transmitting station and returning the balance of the beamed radiant energy in the form of a downwardly and outwardly inclined annular shell-like beam of radiant energy encircling the beamed energy from the transmitting station in an annular radially spaced ring.

Other objects and advantages of the invention will become apparent from the following description and accompanying drawing in which like reference characters refer to like parts in the several figures.

FIGS. 1 and 2 respectively show a plan or elevational view, and a cross-sectional view taken about on line 2—2 of FIG. 1, showing a positive or convex lens having a spherical curvature which is divided into a plurality of equal segments with a reflector at the focal point of the lens, prior to radial separation of the segments.

FIGS. 3 and 4 illustrate an elevational or plan view, and a cross-sectional view on line 4—4 of FIG. 3 illustrating the spherical lens segments shown in FIGS. 1 and 2 separated, with the reflecting surface of the reflector extending in a plane through the focal points of the spherical lens segments, in order to illustrate the invention.

FIGS. 5 and 6 are a plan view and a cross-sectional view on line 6—6 of FIG. 5 showing the spaced spherical lens segments as seen in FIG. 4 with their median planes inclined toward the central axis of the lens system and toward the plane reflector, and including a central spherical convex lens member having its focal point on the central axis in the plane of the reflecting surface of the reflector.

Figure 8:
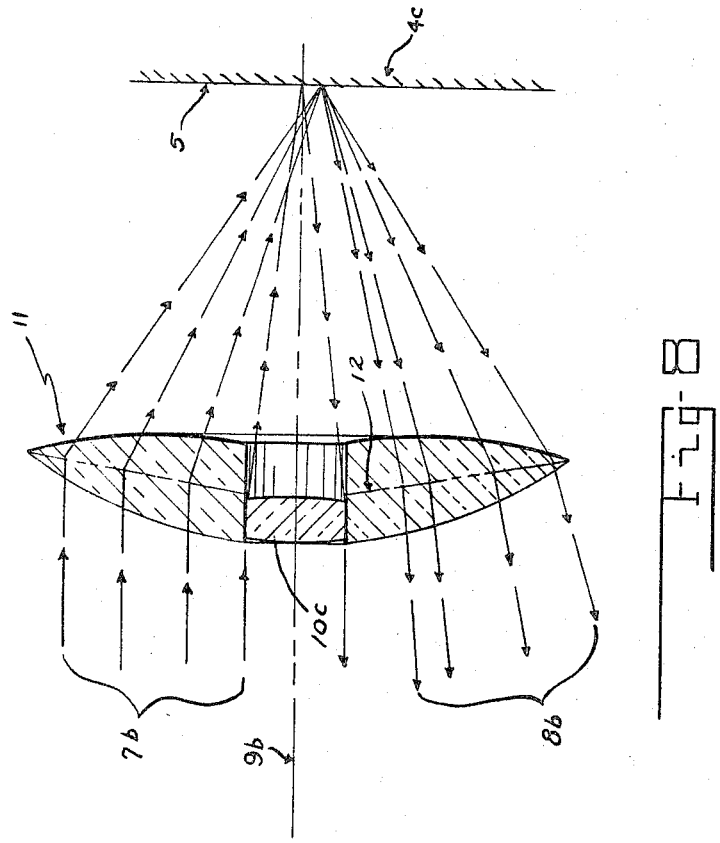
Figure 7:
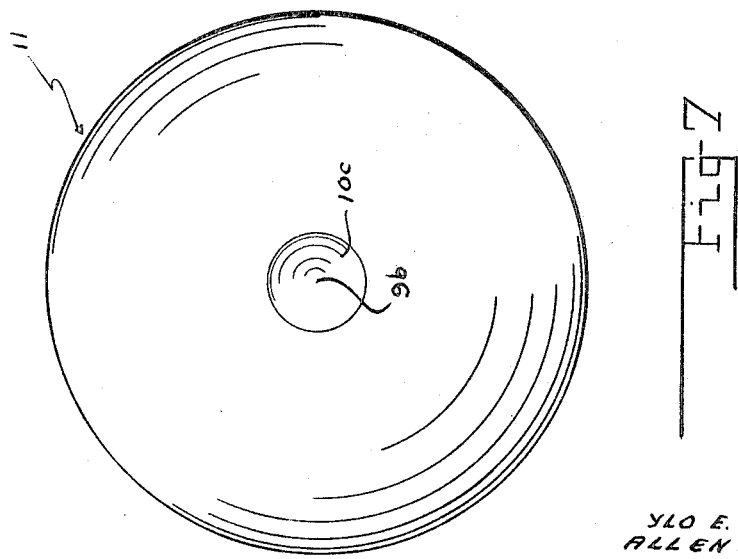

FIGS. 7 and 8 are plan and transverse sectional views respectively showing an annular convex lens with the central lens arrangement, having a plane reflecting surface at the focal "ring" of the annular lens and through the focal point of the central lens, incorporating the invention somewhat in the manner shown in FIGS. 5 and 6.

Figure 9:
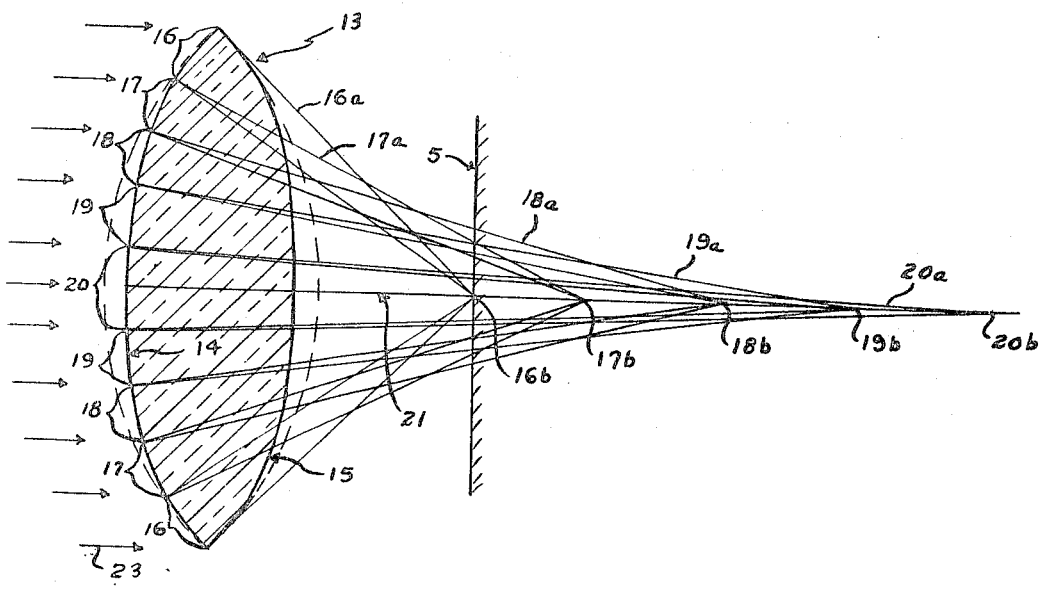

FIG. 9 discloses a further modification of an electromagnetic lens construction for carrying out the invention in which the curvature of the lens surface consists of a plurality of annular rings blending into the edges of each other, each ring having a progressively different radius of curvature.

FIG. 10 is a schematic sectional view through a further modification of the invention using a convex reflector instead of a lens, using a conventional reflector, or lens and reflector system, as a radar target or a communication relay for instance as a passive satellite.

In most instances it is desired that the useful reflected energy be at a maximum. The usual "focused reflection" technique provides a directional scattering whereby the reflected energy can be concentrated into any beam width. Used as radar targets very narrow beam widths are mostly desired. However, for long range communication purposes, for instance in connection with satellites in space, the reflected energy should cover a rather large area. This means that the reflected energy is conventionaly "back scattered" in a conical area with a base radius of the required communication distance surrounding and including the transmitter and the receiver sites.

In addition, a communication link never, or rarely, is required to have much of the transmited radiant or electro-magnetic energy reflected back to the transmitter, but as much as possible, the reflected energy should be transmitted to the receiving site located at some remote distance from the energy transmitting station or site, and much of this reflected or back scatter radiant radiant energy between the transmitter site and the receiver site is wasted, making the reflected energy reaching the receiving site unnecessarily reduced.

It is most desirable that most of the reflected energy should be concentrated in a sort of conical shell-like area surrounding the transmitter site and covering a reasonably wide ring-like area in which the receiving site is located.

This invention provides a simple means for carrying out the above in the form of specially shaped electromagnetic lens and reflector means whereby parallel rays from a transmitter are reflected back in the form of a hollow cone-shaped area with only a small portion of the beam reflected directly back toward the transmitter, inside of the concentrated reflected energy in the conical shell-like area for control or tracking.

In providing one form of electromagnetic lens and reflector system, a conventional bi-convex electromagnetic thin lens is indicated at 1 in which the surfaces 2 and 3 are spherical and have a focal point at 4 through which the reflecting surface 5 of a plane reflector extends in perpendicular relation to the central axis 9 of the lens. The lens 1 may be made of any suitable material, for instance, "Plexiglass," "polystyrene," or other material for focusing radar and other electromagnetic waves received from a suitable transmitter, to the focal point 4 whereby it is reflected by the reflector 5 back through the lens 1 toward the transmitting station (not shown).

In carrying out this form of the invention, the lens 1 is cut transversely through its central axis 9 as indicated at 6, in a plurality of equal circumferentially spaced planes to form a plurality of lens segments 1a. Six segments 1a, which are identical, are shown in FIGS. 1 and 3 although it is obvious that the lens 1 could be cut into a much greater number of segments 1a than the number shown.

It will be observed that any incoming substantially collimated rays or radiation such as 7 from a remote transmitter (not shown) will be refracted to the focal point 4 and reflected back by the plane reflector 5 through the lens 1 as returned energy rays 8 parallel to the rays 7, in other words, returned back to the transmitter site. Changing the position of the reflector 5, for instance, toward or away from the lens fans out the returned radiant energy in a solid conical area. Since a receiving or "tracking" station is located in remote relation to the transmitter site, the "back scattered" energy between the receiver and transmitter sites is weak and not very useful.

By separating the segments 1a somewhat after the manner shown in FIGS. 3 and 4, the incoming collimated rays such as 7', with the plane reflector 5 at the focal points 4a of the segments 1a disposes the focal points of all of the segments in a ring about the central axis 9 of the lens unit and the reflected rays in the form of returned radiation is "back scattered" through a conical shell-like area 8' which surrounds the incoming rays 7' in remote but surrounding relation to the transmitter site. The lens segments may be firmly set in pitch or suitable plastic to form an integral lens unit. This arrangement leaves a central opening 10 into which a conventional bi-convex lens 10a is fixed having its focal point on the central axis 9 in the plane of the reflector 5, for the purpose of reflecting or back scattering only a small portion of the reflected energy to the transmitter for tracking and control purposes that might be otherwise lost. The arrangement just described provides a three dimensional lens unit of these separate lens segments 1a in a circular pattern something similar to a doughnut and will focus the parallel incoming beams at opposite sides of the lens into two points. The collection of all of these points results in a focal "ring" exactly the size of the separation distance between the inner or apex ends of the lens segments 1a.

As seen in FIGS. 5 and 6, the lens 1' also is composed of circumferentially (and radially) spaced bi-convex spherical lens segments 1b in which the median planes of the lens segments are tilted toward the optical axis 9a of the unit toward the reflector 5 to improve the conical shell-like back scattering zone 8a with an effort of reflecting more energy through the conical shell-like area to cover a ring-like area around the transmitter site which is wider than the area provided in the form shown in FIGS. 3 and 4. The incoming collimated radiant energy beams 7a upon striking the reflector 5 at the focal "ring" 4b is reflected back through the opposite sides of the lens unit, being refracted by the lens segments to form the annular conical shell-like beam 8a, the central portion of the transmitted beam passing through the small central bi-convex lens 10b is reflected back along the central axis 9a toward the transmitter site for tracking and control purposes.

A further modification is shown in FIGS. 7 and 8 in which the electromagnetic lens is an annular doughnut or ringshaped lens element 11 in which the radius of curvature of the lens surface starts at a predetermined radical distance from the central axis 9b as shown, to provide a solid or integral or one-piece lens somewhat the general contour as shown in FIG. 6 with the annular median plane 12 inclined outwardly and rearwardly toward the reflector 5 so that all parallel or collimated incoming rays such as 7b are refracted across the central axis into a focal ring 4c, and since the focal points of all the individual rays are off axis they are reflected by the reflector 5 and refracted by the lens in the form of a conical shell-like beam 8b. The inner annular edge of the lens 11, where the curvature of the lens surface starts, is formed or fitted with a bi-convex thin lens 10c having its focal point at the reflecting surface of the reflector 5 so that a small central portion of the rays 7b from the transmitter are reflected directly back to transmitter on the central axis for tracking and/or control purposes, the balance of the transmitted beam being "back scattered" downwardly in the form of an outwardly expanding conical shell-like beam 8b so as to cover a receiving station or stations located at a remote distance from the transmitter, with an increase in energy over the conventional "back scattering" which usually covers the entire base of a conical area including both the transmitter site and the receiver site.

A further modification of the lens system is shown schematically in FIG. 9 in which the lens is bi-convex, "figured" so to speak, that the outer surfaces of the lens are formed of a series of annular spherical concentric rings, each ring having a progressively different radius with its center on the central axis and the lengths of the radii increasing in length in a direction away from the lens surface, from the outer periphery of the lens toward its center.

In FIG. 9 the lens is indicated at 13 having identical convex surfaces 14 and 15 in which each surface is composed of a plurality of annular ring-like spherical surfaces 16, 17, 18, 19 and 20 figured on different increasing radii 16a, 17a, 18a, 19a and 20a with their centers at 16b, 17b, 18b, 19b and 20b located on the central axis 21 of the lens, the adjacent edges of these spherical surface rings 16 to 20, so to speak, blending into each other to form the convex surfaces 14 and 15 of the lens. The dotted lines depict the departure of the convex surfaces 14 and 15 from a true spherical surface having a radius equal to 16a. Of course, the small number of rings 16 to 20 is shown for an example as the number could be increased if desired, especially in connection with a very large lens.

It will be seen that all substantially collimated rays 23 parallel to the lens axis and sticking the respective rings or zones will have different (or axis) focal points of 16b to 20b.

In FIG. 10 illustrating a further embodiment for carrying out the invention the reference numeral 21 denotes an annular or ring-shaped reflector for electromagnetic rays or energy having an annular upwardly and outwardly inclined reflecting surface 22 having spherical curvature with a central opening in which is fixed a bi-convex lens 23 having a focal point 24 at which a reflector 25 is located perpendicular to the centeral axis 26.

Radiant energy from a transmitting station is indicated at 27. This radiation which strikes the circular inclined spherical reflector portion 22 is reflected or back scattered in the form of an annular downwardly expanding conical shell-like beam 28 while the central portion of the beam 27 which strikes the lens 23 is reflected directly back by the reflector 25 to the transmitting station for tracking or control purposes. The radius of curvature of the surface of the reflector 22 must be necessarily large, the length of this radius, of course, determining the spread between the inner and outer portions of the reflected or "back scattered" conical shell-like energy beam. The device may be carried by a passive satellite or space vehicle indicated diagrammatically at 27a.

For purposes of exemplification, a few particular embodiments of the invention have been shown and described to the best understanding thereof. However, it will be understood that changes and modifications in the arrangement and construction of the parts thereof may be resorted to without departing from the true spirit and scope of the invention as set forth in the following claims.

We claim:

1. A lens for electromagnetic rays comprising, a bi-convex lens, having a central axis and a uniform curvature starting at its periphery and terminating in radially-spaced relation to its central axis for refracting collimated electromagnetic rays passing through the lens to a focal ring concentrically surrounding said central axis, and a reflector having a plane reflecting surface extending through said focal ring perpendicular to said central axis for reflecting collimated rays refracted by said lens to said focal ring, back through said lens to be refracted thereby to form an annular outwardly expanding conical shell-like reflected electromagnetic energy beam surrounding said collimated rays in radially spaced relation thereto.

2. Means for reflecting substantially collimated electromagnetic rays received from a transmitting site back to a receiving site located in materially radially spaced relation to said transmitting site comprising, an electromagnetic bi-convex lens having a central axis, said lens having a central spherical bi-convex portion having a focal point on said central axis, and an annular uniformly curved portion surrounding said central spherical portion having a focal ring surrounding said central axis in a plane through said focal point perpendicular to said central axis, and a plane reflector perpendicular to said central axis extending through said focal point and said focal ring, whereby collimated electromagnetic energy beams from a transmitting site striking said lens substantially parallel to the central axis thereof is refracted by said central and annular lens portions to said focal point and focal ring respectively and reflected back through said lens and refracted thereby to form a central substantially collimated return beam to said transmitting site and a surrounding outwardly expanding conical shell-like energy beam in radially spaced relation to said collimated returned beam to provide an encircling returned energy beam adapted to include said beam-receiving site.

3. An electromagnetic lens comprising a plurality of equal circumferentially spaced similar segments of a bi-convex lens having spherically curved surfaces arranged around a central axis with the apexes of the segments disposed in predetermined radially spaced relation to said central axis to dispose the focal points of the segments in a concentric "focal ring" around said central axis.

4. In an electromagnetic ray reflecting system, a lens as set forth in claim 3, and a reflector having a plane reflecting surface behind said lens in perpendicular relation to said central axis, extending through the focal ring of said segments.

5. A reflecting system for electromagnetic collimated energy rays as set forth in claim 4 including a bi-convex lens having a spherical curvature concentrically disposed on said central axis, surrounded by the apex portions of said segments with the focal point thereof in the plane of the reflecting surface.

6. A reflecting system as claimed in claim 5, in which the median planes of the segments incline equally from the central axis and toward the plane of the reflecting surface containing the ring of focal points of the inclined lens segments.

7. Means for reflecting a collimated radiant energy beam from a transmitting station back in the opposite direction in the form of an expanding conical shell-line radiant energy beam surrounding the transmitted collimated radiant energy beam in radially spaced relation thereto comprising a plane annular reflector having a central axis and comprising an annular ring-like spherical convex reflecting surface concentrically surrounding the central axis and inclining rearwardly and outwardly away from said central axis and from the direction of the incoming collimated radiant energy beam whereby a collimated radiant energy beam from a transmitting station striking said outwardly and rearwardly inclined annular convex reflecting surface is reflected back in the opposite direction in the form of an annular expanding conical shell-like returned radiant energy beam surrounding said central axis and the transmitting collimated radiant energy beam in radially spaced relation thereto, including a bi-convex electromagnetic spherical lens concentrically fixed in the center of said annular reflector having a central axis concident with the central axis of said reflector, for refracting a central portion of said transmitted radiant energy beam to a focal point on said central axis, behind said lens, and a radiant energy reflector having a plane reflecting surface extending through said focal point perpendicular to said central axis, for reflecting and refracting the aforesaid central portion of said transmitted radiant energy, beam back along the central axis toward the radiant energy transmitting station in the form of a substantially collimated returned radiant energy beam.

References Cited by the Examiner

UNITED STATES PATENTS 3,206,749   9/1965   Chatelain _____ 343—18

OTHER REFERENCES

Stahler and Johnson: Directive Non-Oriented Reflectors as Passive Satellites in Long Distance Communications, March 1960.

Emerson and Cuming, Inc. Catalogue: Plastics/Ceramics for Electronics, October 1960.

HERMAN KARL SAALBACH, *Primary Examiner.*

RONALD COHN, *Assistant Examiner.*